TRAINABLE COMPUTER MODULE

Filed April 17, 1968 6 Sheets-Sheet 1

INVENTOR
EDWARD M. CONNELLY
BY Hurvitz, Rose & Greene
ATTORNEYS

INVENTOR
EDWARD M. CONNELLY

BY Hurvitz, Rose & Greene

ATTORNEYS

TRAINABLE COMPUTER MODULE

Filed April 17, 1968 6 Sheets-Sheet 3

INVENTOR
EDWARD M. CONNELLY

BY Hurvitz, Rose & Greene

ATTORNEYS

INVENTOR
EDWARD M. CONNELLY
BY Hurwitz, Rose & Greene
ATTORNEYS

INVENTOR
EDWARD M. CONNELLY

BY Hurvitz, Rose & Greene

ATTORNEYS

INVENTOR
EDWARD M. CONNELLY

BY Hurvitz, Rose & Greene
ATTORNEYS

United States Patent Office 3,566,359 Patented Feb. 23, 1971

3,566,359

TRAINABLE COMPUTER MODULE

Edward M. Connelly, Springfield, Va., assignor to Melpar, Inc., Falls Church, Va., a corporation of Delaware

Filed Apr. 17, 1968, Ser. No. 722,076
Int. Cl. G06f *15/18*
U.S. Cl. 340—172.5 16 Claims

ABSTRACT OF THE DISCLOSURE

A trainable logic circuit capable of organization to provide combinatorial logical functions and memory functions according to a desired objective, includes as a part of the minimal circuit structure sufficient to produce any of the desired functions a pair of dual input-single output trainable logical networks of the type in which minterm products representing all combinations of the input variables are formed and directed to statistical switches which in turn provide connectives for passing (or blocking) the respective functional combination to an OR gate supplying the network output. The memory function for the trainable logic circuit is provided by feedback circuits cross-coupling the output terminal of each network to an input terminal of the other. Training signals are supplied to the circuit switches as desired to force the circuit toward the implementation of a desired function.

BACKGROUND OF THE INVENTION

The present invention relates generally to logical elements for self-organizing or adaptive networks, and more particularly to a trainable computer module which can be organized to provide the logical functions required for fabrication of any digital computer.

In general, the self-organizing or trainable logical network is a machine intelligence system capable of adjusting its own operation to conform to a desired response to a set of external stimuli. Such networks have the capability of being trained to respond in the desired manner by continuous internal assessment of past network reaction to the same stimuli and comparison of the reactions with a specified pre-programmed or dynamically variable objective or "goal" function. In particular, the network's behavioral pattern relative to a specific set of stimuli may be internally self-adjusted in a statistical fashion in accordance with training signals generated in response to the aforementioned comparison.

Exemplary trainable logical networks are disclosed by Lee in U.S. Pat. 3,327,291, using various arrangements of Artron (artificial neuron) elements, and by Halpern in U.S. Pat. 3,262,101, describing a so-called SOBLN (Self-Organizing Binary Logical Network) which reduces the number of elements required to perform the same logical function organization as the Lee apparatus, in a multi-input, multi-output network. While these and other prior art trainable logic circuits are perfectly satisfactory for their intended purposes, that is, organization to any combinatorial logic function of the set of independent input variables, they are incapable of performing any memory (sequential logic) functions.

It is a principal object of the present invention to provide a trainable logic circuit capable of organization to memory functions as well as to combinatorial logic functions.

Considering present methods of design and construction of logic systems, it will be observed that conventional logic systems are designed to allow fabrication with a family of modular circuits. Each module consists of a collection of fixed logic elements, such as AND circuits, OR circuits, flip-flops, and so forth, packaged together as necessary to perform or provide certain specified functions, for example, a three-input AND gate, a J–K flip-flop, and so on.

It is common practice to devote considerable design effort to the minimization of the number of different types of modules required in the overall system; typically, however, each logic system ultimately requires many different types of modules, despite the best efforts of the designer. As a result, the cost of the final system must include the development or purchase, test, and inventory of each type of module. The problem of selecting a standard module that may be repeated throughout a system has achieved the status of a paradox in integrated circuit technology. Whereas integrated or monolithic circuit techniques permit the fabrication of numerous active circuits in a single package (e.g., 100 or more active devices in one flat pack by use of metal oxide-silicon techniques), it is nevertheless increasingly difficult to develop a standardized subcircuit which may be multiplied in use within a system. It frequently appears that the improved circuit fabrication process leads to a requirement of a larger family of modules than would otherwise be necessary.

For example, integrated circuit shift registers are readily available with from 10 to 100 register stages. However, many circuits require connections to intermediate register stages as well as to the first and last stages. Since the number of connections to the device is limited, each combination of connections requires fabrication of a different device. Thus, one is faced with a situation in which a conventionally wired shift register of substantially larger dimensions than the integrated circuit variety could be stocked and use as a standard item, with simply a variation in wiring to suit each different combination of connections required for repeated shift registers throughout the system; whereas the integrated circuit package is, by its very nature, restricted in use insofar as variation or shifting of leads is concerned once the final package configuration is completed.

It is therefore another broad object of the present invention to provide a trainable computer module which may be fabricated in a standard or universal form and subsequently organized to any of a variety of desired functional circuit configurations to suit the needs of a specific logic system.

SUMMARY OF THE INVENTION

Briefly, according to the present invention a trainable computer module or logic module effectively comprises conventional logic circuits such as AND and OR gates to be used as building blocks, and a trainable or organizable circuit to be used for modifying the internal connections. In essence, the module combines the combinatorial logic functions provided by trainable logical networks of the aforementioned prior art type (e.g., Artron and SOBLN circuits), and sequential logic or memory functions obtained by use of special feedback circuits between output and input of a multi-input, multi-output trainable logical network.

The minimal or simplest trainable computer module in part comprises two 2-input 1-output trainable logical networks, preferably of the SOBLN type disclosed in the aforementioned Halpern patent, in which each set of input variable is supplied to a respective minterm generator and the canonical products obtained therefrom selectively fed to a respective OR gate according to the immediate states of a group of decision elements (statistical switches) whose individual and collective states are trainable to achieve an output from the OR gate commensurate with a desired goal. According to the present invention, the minimal module which contains sufficient circuitry to provide all combinatorial logical functions and the sequential (memory) functions also includes cross coupling feedback between each network output terminal and an input terminal of the other network. The latter input terminal is connected via an inverter or negation circuit to a further statistical switch, which is in turn coupled to the respective OR gate. The arrangement is such that if the feedback switches are closed, the module provides a logical memory and can be trained to set one output while the other output is reset, or vice versa. Means are provided for training the module, and the switches in particular, to provide a desired functional circuit configuration.

It is not sufficient that the module provide a memory, if that memory is erased in the power-off condition. In other words, the trainable circuit portion of the module is used to modify the internal connections, and for any given internal connections the trainable circuit represents the wire connections of conventional circuits. If the memory is not provided for the trainable circuits when system power is removed or interrupted for any reason, the computer "wiring" can and will change. According to an important feature of the invention, temporary or semi-permanent memory is assured during power-off periods by use of an electrical storage device which is charged during intervals when the power is on, and then utilized to supply the required current to the switching devices when the power is cut off.

Certain embodiments of the invention include an added aspect of redundant circuitry, to permit retraining around internal switch failures.

Still another feature of the invention resides in the provision of an A.-C. switching capability in the circuit to allow generation of an output pulse triggered by a change in input state. This facilitates organization of the circuit to perform counter, shift register and pulse circuit functions.

Accordingly, further objects of the invention include the provision of a universal trainable computer module which may be organized to sequential as well as to combinatorial logic functions, and to both A.-C. and D.-C. logic functions; and the provision of a single standard type of module which can be used extensively in the higher component densities allowed by integrated circuit technology.

Returning to the integrated circuit shift register example, if the register has 100 stages and 10 leads available for external connections to the stages, the application of trainable logic techniques of the present invention will permit organizable connection of the 10 leads to any 10 shift register stages. Clearly, this produces a device with greater flexibility, in that it is capable of adapting itself to any number of specific applications. Even greater flexibility may be achieved by providing internal trainable logic to allow 10 logical functions of various shift register outputs.

Among the various advantages of the invention are the following: reduction of system inventory requirements, provision of circuit repairs by retraining, implementation of circuit redesign by retraining, increased reliability of circuit and lower assembly costs as a result of the increased proportion of connections accomplished internal to the module, and lower cost of purchasing and testing of modules.

BRIEF DESCRIPTION OF THE DRAWINGS

The above and still further objects, features, and attendant advantages of the present invention will become apparent from a consideration of the following detailed description of certain preferred embodiments thereof, especially when taken in conjunction with the accompanying drawings, in which.

DESCRIPTION OF SOME PREFERRED EMBODIMENTS

Figure 1:
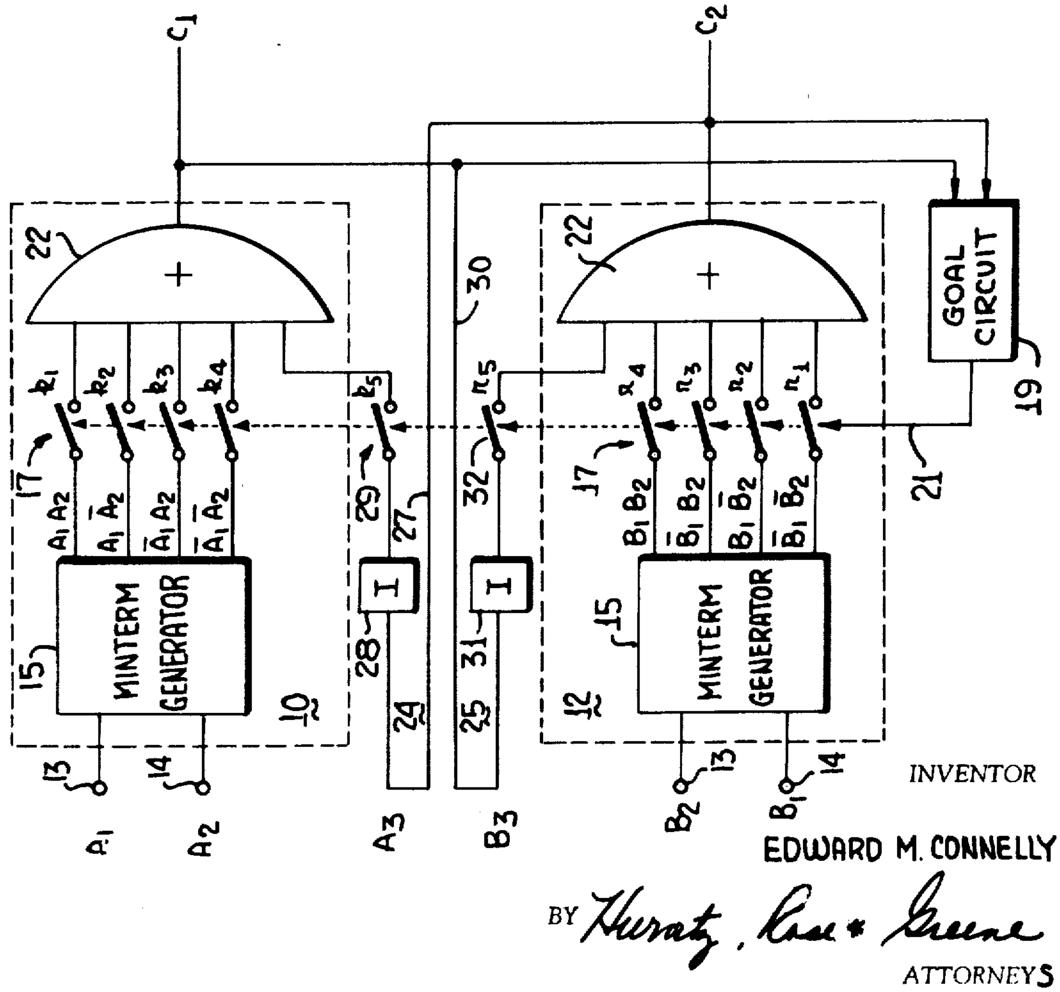
FIG. 1 is a circuit diagram, partly blocked and partly schematic, of a minimal configuratioin of the trainable computer module (TCM)

Referring to FIG. 1, the minimal circuitry sufficient to provide all combinatorial logical functions and the sequential (memory) functions is embodied in a pair of two input-single output trainable logical networks of a type disclosed, for example, in the aforementioned Halpern patent, with additional cross-coupling feedback circuits.

In particular, each trainable logical network, designated respectively by reference numerals 10 and 12, includes a pair of input terminals 13, 14 to which variables to be operated upon by the network are applied. These variables are fed to a minterm generator 15 which functions to supply outputs consisting of the canonical products of the input variables (including their negations, or inversions). Each network may also contain a group of statistical switches 17 of the type that provide connectives according to the particular statistical state in which they are presently operating as a result of the current (i.e., present) training imposed on them by a suitable goal circuit 19. In essence, the goal circuit has the role of organizing the networks toward a specific objective, and, to this end, it may be provided with a set of criteria of either static or dynamic nature, or both. Just what these criteria are will depend on the nature of the overall function to be performed. For example, it may be desired that the networks operate to perform a particular logic function of the input variables, in which event the goal circuit is supplied with suitable logic circuits that perform that specific function on the same input variables as those supplied to the networks themselves, and with a comparator to test the output function actually formed by the trainable network against the desired function formed by the internal fixed logic circuits. More often, the goal of the system may depend upon a number of external factors or conditions which are sensed and converted to representative electrical signals for variably determining the objective to which the network is to be organized. Furthermore, the determination of whether the network is responding in the desired manner may be made by sensing the operation of a controlled element (i.e. a "plant") to which the network output functions are applied as control signals. The plant sensors, in the form of electrical transducers, then provide representative electrical inputs to the goal circuit, rather than simply supplying the network output functions to the goal circuit as shown in FIG. 1. If the trainable networks are forming the desired function the statistical switches are suitably reinforced to continue the same network operation; otherwise, they are not.

For the sake of simplicity and clarity of the present discussion, only a single lead 21 is shown for application of training signals to the statistical switches, although the manner in which the training signals are applied to the switches will generally depend upon the specific training mechanism or mode selected for use in the circuit. For the sake of illustration, some of the possible methods of logic module training will be discussed later in this specification. At present, however, it may be noted that the general structure and operation of trainable logical networks of the type under discussion are now widely known in the art, and the uninitiated reader is directed to the aforementioned Lee and Halpern patents, and to patents and publications related thereto, for a more complete description.

The connectives (i.e., closures and non-closures) formed by switches 17 in response to the training signals determine which of the combinations of the input variables appearing at the output terminals of the respective minterm generator 15 is to be supplied to an OR gate 22, and thence to the network output terminal as the network logic function. It is readily observed that the logical equations for the networks 10 and 12, as thus far described, are:

$$C_1=k_1A_1A_2+k_2\bar{A}_1A_2+k_3A_1\bar{A}_2+k_4\bar{A}_2\bar{A}_2 \qquad (1)$$

$$C_2=r_1B_1B_2+r_2\bar{B}_1B_2+r_3B_1\bar{B}_2+r_4\bar{B}_1\bar{B}_2 \qquad (2)$$

where $C_1$ is the output function, $A_1$ and $A_2$ the input variables, and $k_j$ ($j=1, 2 \ldots n$) the state of the corresponding statistical switch (e.g., $k_j=1$ indicates that the respective switch is closed), for trainable logical network (TLN) 10, and $C_2$, $B_1$, $B_2$, and $r_j$ are the corresponding items for TLN 12.

According to the present invention, the trainable computer module (TCM) or trainable logic system further includes a pair of cross-coupling feedback circuits 24 and 25, the former comprising path 27 connected to the output terminal of network 12 to supply function $C_2$ to inverter circuit 28 and the inverted function then to OR gate 22 of network 10 according to the state of statistical switch 29 ($k_5$). Feedback circuit 25 comprises path 30 for supplying output function $C_1$ of network 10 to inverter circuit 31, and the inverted function to OR gate 22 of TLN 12 according to the state of statistical switch 32 ($r_5$).

If we let $$Z_1=k_1A_1A_2+k_2\bar{A}_1A_2+k_3A_1\bar{A}_2+k_4\bar{A}_1\bar{A}_2 \qquad (3)$$

and $$Z_2=r_1B_1B_2+r_2\bar{B}_1B_2+r_3B_1\bar{B}_2+r_4\bar{B}_1\bar{B}_2 \qquad (4)$$

then, Equations 1 and 2 become, with consideration of the feedback circuits, $$C_1=Z_1+k_5\bar{A}_3 \qquad (5)$$

$$C_2=Z_2+r_5\bar{B}_3 \qquad (6)$$

where the feedback connections are described by $$A_3=C_2 \qquad (7)$$

$$B_3=C_1 \qquad (8)$$

and $\bar{A}_3$ and $\bar{B}_3$ in Equations 5 and 6 are, of course, the respective inversions of $A_3$ and $B_3$.

Therefore, $$C_1=Z_1+k_5\bar{C}_2 \qquad (9)$$

$$C_2=Z_2+r_5\bar{C}_1 \qquad (10)$$

Substituting the expression for $C_2$ in Equation 9 we obtain $$C_1=Z_1+k_5\overline{(Z_2+r_5\bar{C}_1)} \qquad (11)$$

or, manipulating, $$C_1=Z_1+k_5\bar{Z}_2(\bar{r}_5+C_1) \qquad (12)$$

Similarly, $$C_2=Z_2+r_5\bar{Z}_1(\bar{k}_5+C_2) \qquad (13)$$

Equations 12 and 13 clearly indicate the provision of a logical memory in the circuit of FIG. 1. If, for example, feedback switches 29 and 32 are closed (i.e., $k_5=r_5=1$) and the output function of each TLN without feedback is a logical 0 (i.e., $Z_1=Z_2=0$), then Equations 12 and 13 become $$C_1=C_1$$

$$C_2=C_2$$

But, from Equati on 9

$$C_1=\bar{C}_2$$

Thus, either $C_1=0$, $C_2=1$, or $C_1=1$, $C_2=0$.. If it is assued that $Z_1$ is changed such that $Z_1=1$, with all the other recited conditions of $k_5$, $r_5$ and $Z_2$ remaining unchanged, then from Equations 12 and 13

$$C_1=1+C_1=1$$

$$C_2=O$$

Now if $Z_1$ is again a logical 0, the values of $C_1$ and $C_2$ remain unchanged in that $C_1=1$, $C_2=0$, because of the presence of closed feedback circuit 24 ($k_5=1$) and the fact that $C_1=\bar{C}_2=\bar{0}=1$. On the other hand, the value of $Z_2$ can clearly affect $C_1$, and in particular can result in $C_1=0$.

In other words, with $r_5=k_5=0$ (i.e., the feedback switches open), the minimal TCM of FIG. 1 provides a pair of two-input trainable networks which can be organized to provide any combinatorial logical function of the input variables. However, with $r_5=k_5=1$ (i.e., the feedback switches closed), the TCM provides a logical memory. This is observed from the respective absence and presence of the second term of the logical sum in Equations 12 and 13, for the feedback switch open and closed conditions. In the feedback switch closed condition, the TCM configuration can be trained such that any logical function of the input variables $A_1$, $A_2$ can set the output of network 10 ($C_1=1$), and any logical function of input variables $B_1$, $B_2$ can reset the output of network 10 ($C_1=0$). The reverse is true for the output of network 12.

The state of the trained module is conveniently represented by the following format or notation:

| | | | | |
|---|---|---|---|---|
| $k_1$ | $k_2$ | $k_3$ | $k_4$ | $k_5$ |
| $r_1$ | $r_2$ | $r_3$ | $r_4$ | $r_5$ |

where the state of each switch is identified as a 1 or a 0, depending on whether it is closed or open, respectively, in the associated box of the format.

Figure 2:
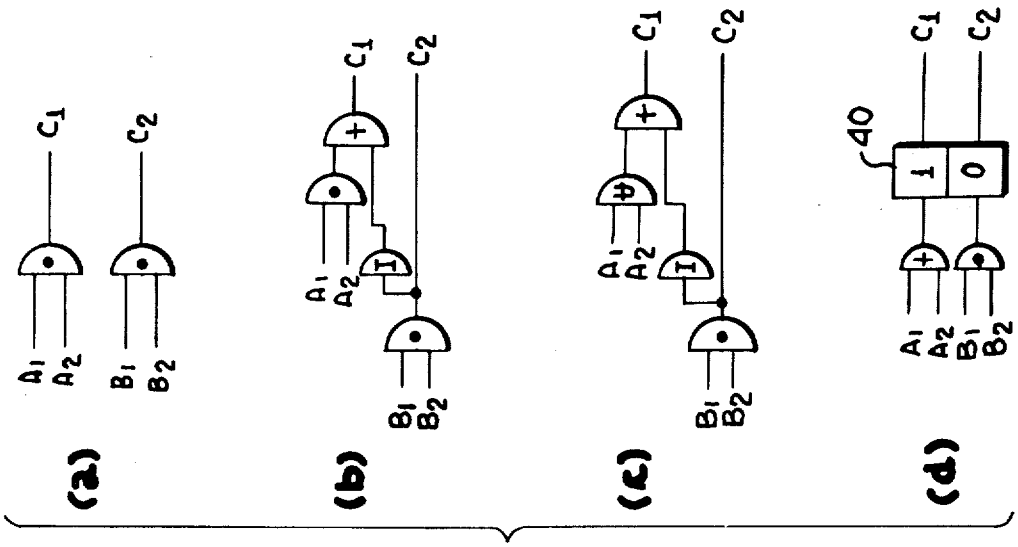
FIGS. 2(*a*), (*b*), (*c*) and (*d*) are circuit diagrams of exemplary logic circuits which can be implemented by appropriate organization of the TCM of FIG. 1.

Using the above notation with reference to the trained condition of the module to produce the circuit configurations of FIG. 2, it will be observed that the device is trained to two AND gates without network coupling, as shown in FIG. 2(a), by implementing the format:

| | | | | |
|---|---|---|---|---|
| 1 | 0 | 0 | 0 | 0 |
| 1 | 0 | 0 | 0 | 0 |

That is to say, the logic circuit of FIG. 2(a) is obtained by organizing the trainable circuit module of FIG. 1 such that the switches responsive to the logical products $A_1A_2$ and $B_1B_2$ from the respective minterm generators are closed (i.e., $k_1=r_1=1$), while the remaining switches are open (i.e., $k_{j+1}=r_{j+1}=0$). Similarly, it will be appreciated that the circuits of FIGS. 2(b), (c) and (d) are formed by organizing the TCM of FIG. 1 to the respective formats

| | | | | |
|---|---|---|---|---|
| 1 | 0 | 0 | 0 | 1 |
| 1 | 0 | 0 | 0 | 0 |

(FIG. 2(b))

| | | | | |
|---|---|---|---|---|
| 0 | 1 | 1 | 0 | 1 |
| 1 | 0 | 0 | 0 | 0 |

(FIG. 2(c))

| | | | | |
|---|---|---|---|---|
| 1 | 1 | 1 | 0 | 1 |
| 1 | 0 | 0 | 0 | 1 |

(FIG. 2(d))

It will also be clear that these examples do not by any means exhaust the possible circuit configurations that may be produced by appropriate organization of the TCM of FIG. 1. In FIG. 2(c), the symbol ⊻ refers to an EXCLUSIVE OR function, and in FIG. 2(d) the element numbered 40 is a flip-flop..

Figure 3:
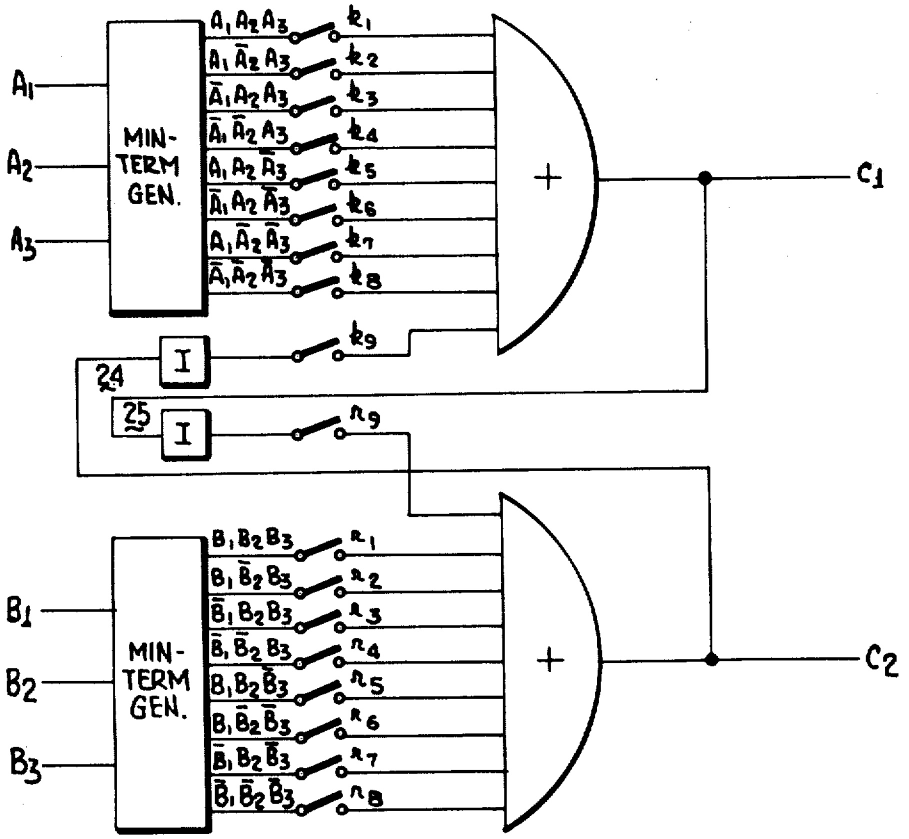
FIG. 3 is a circuit diagram of a TCM having extended input capability over the minimal configuration of FIG. 1.

More elaborate logic functions and an extended input capability are obtainable by use of the SOBLN approach as taught by Halpern in his aforementioned patent (although other approaches may also be used), together with the principles of the present invention in respect to the feedback circuit arrangement. One such configuration is shown in FIG. 3, and it will be noted that the feedback circuitry 24, 25 is the same as that used for the minimal TCM circuit of FIG. 1.

Figure 4:
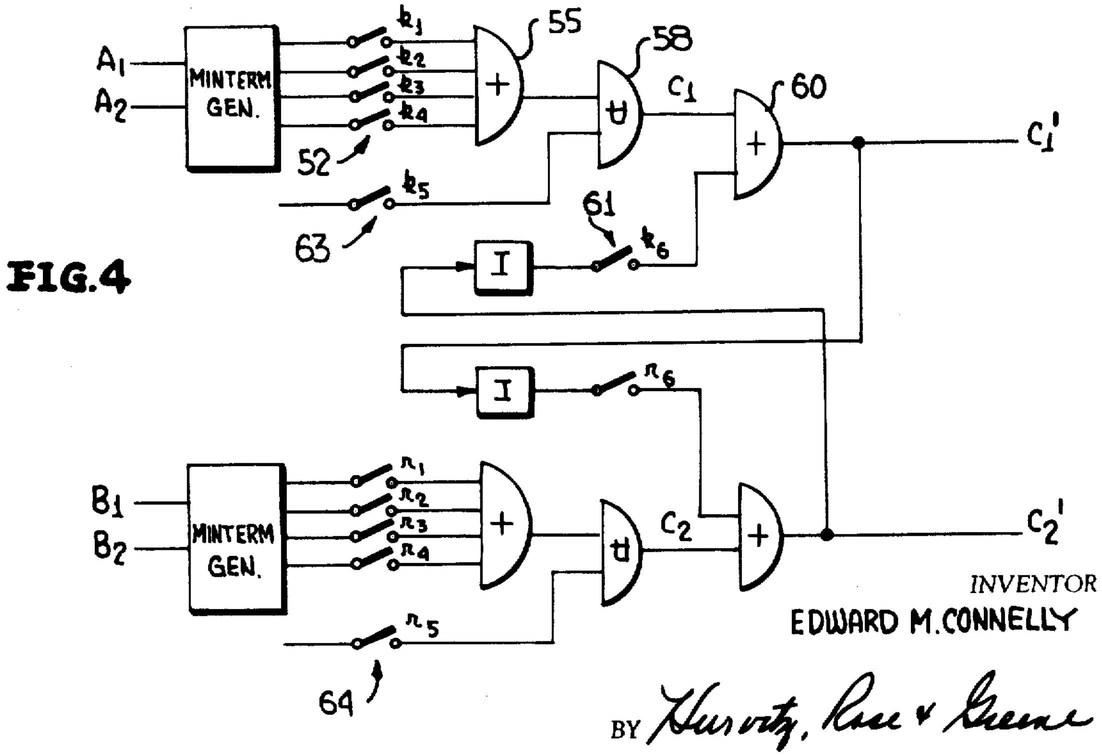
FIGS. 4 and 5 are circuit diagrams of tarinable computer modules containing redundant circuits to permit retraining for circuit repair or redesign.

FIG. 4 illustrates the incoropration of redundant logic circuits in a trainable computer module of the type described. Inputs $A_1$ and $A_2$ are supplied to minterm generator which in turn provides all non-redundant product combinations of these two inputs and their negations to respective switches $k_1$, $k_2$, $k_3$, and $k_4$ of switch group 52. The output of the switch group is fed to OR gate 55, and obviously may produce an input to one input circuit of EXCLUSIVE OR circuit 58 which is either a logical "1" or a logical "0." The output of the EXCLUSIVE OR circuit is $C_1$, which is fed to OR gate 60 along with the inverted output function $C_2'$ of the other network, provided feedback switch 61 is closed (i.e., $k_6=1$), to provide network output $C_1'$.

Ordinarily, if one of the switches of switch group 52 were to fail, it would render the entire module unusable, assuming the overall module to be of integrated circuit or similar microcircuit construction. However, a single switch failure is easily compensated for in accordance with the present invention by the provision of one additional switch per input section (i.e., one additional switch for each multi-input, single output trainable network), as at 63 and 64 in FIG. 4, to supply an input, when closed, to the other input circuit of the respective EXCLUSIVE OR gate. Thus, if the trainable computer module is initially implemented as shown in FIG. 4, the failure of one switch of a switch group need not destroy the effectiveness of an entire module. To show that the desired compensation for failures is in fact obtained, it should first be recalled that an EXCLUSIVE OR circuit is effective as a controlled "invert-pass" circuit. That is to say, if one input to the EXCLUSIVE OR circuit is a logical "0," the logical values (1, 0) presented at the other input are transmitted to the output (1, 0) wihout modification; whereas if one input is a logical one (1), the logical values (1, 0) presented at the other input are inverted at the output (0, 1). With this in mind, a long as switch 63 is maintained in an open condition (i.e., $k_5=0$) the TCM is unaffected thereby and operates in an identical manner to that shown in FIG. 1. Clearly, it is as though gates 55 and 58 were removed from the network and the outputs of the switches of group 52 applied directly to OR gate 60.

If the extra switch is closed (i.e., $k_5=1$) and a logical "1" is supplied via that path as an input to EXCLUSIVE OR circuit 58, the effect of "function" switches 52 is inverted, in that to obtain the same output function, each "function" switch must be set in the reversed position. Accordingly, it is clear that each function of the input variables can be obtained in either of two ways, i.e., by two switch configurations, using the circuit of FIG. 4. Since one of those switch configurations can be determined from the other by simply reversing the state of each switch ($k_1 \ldots k_5$), any logical function can be obtained with a single switch failed in either the open or closed position. This capability or property of compensating for a single switch failure with a single additional switch (per input network) holds independent of the number of inputs accommodated.

Figure 5:
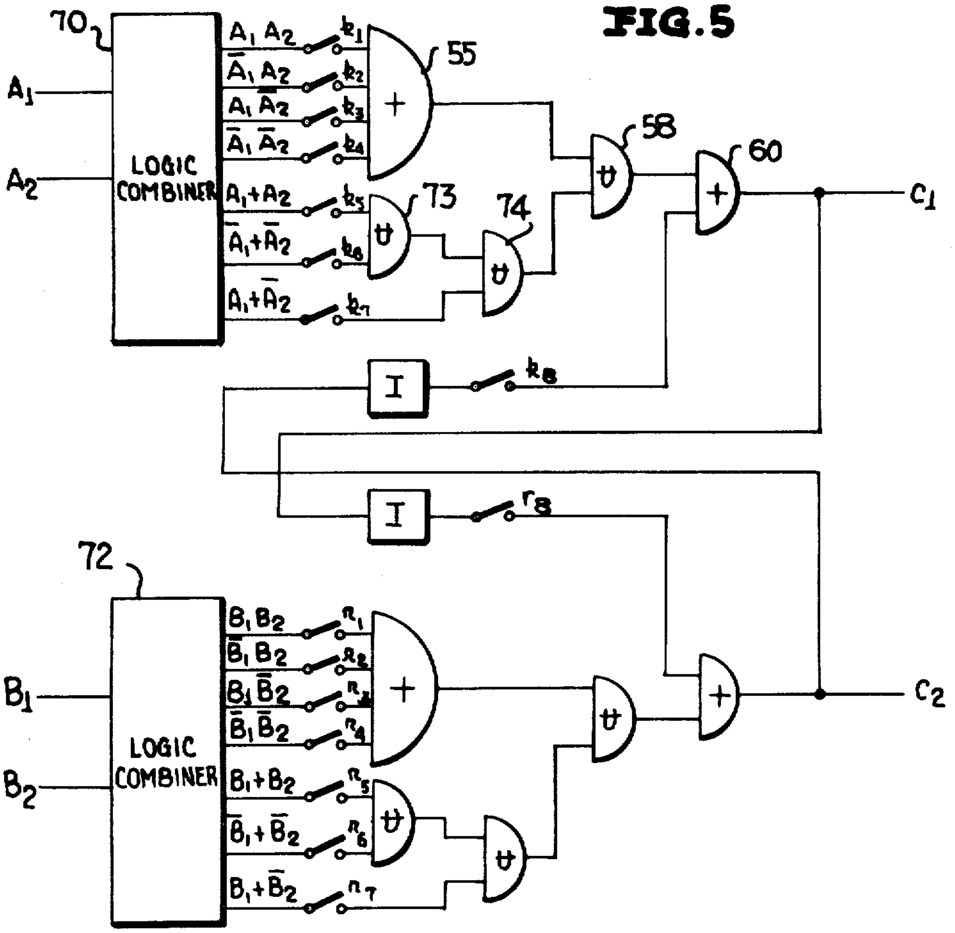

Referring now to FIG. 5, there is shown a TCM circuit with redundant circuit to impart a capability (after training of compensating for up to two switch failures in the input logic. The basic principles employed in the network of FIG. 5 are the same as those applied in the circuit of FIG. 4, except that the number of controls differs because of the use of a logic circuit configuration in which two additional EXCLUSIVE OR circuits 73 and 74 are utilized and the use of OR combinations of the input variables applied to each network. Logic combiners 70 and 72 are of any conventional design suitable for implementing the AND and OR functions shown.

Where it is desired to organize a TCM to function as counter, shift register and/or pulse circuits, it is preferable to include an A-C switching capability in the network so that generation of an output pulse may be triggered by a change in input state. Such a capability may be provided by use of an A-C D-C switch as shown in FIG. 6(b), in the TCM network of FIG. 6(a). Referring first to the switch itself, two input variables ($X_1$ and $X_2$) are illustrated as being accepted by the switch 80, although the number of input variables may be increased, according to network demands. The $X_1$ input is directed to AND gate 81 and to a one shot circuit (monostable) 83, the latter connected to AND gate 84 to supply an input thereto. One shot circuit 83 is an A-C type network in that a pulse output is produced whenever its input switches from a logical 0 to a logical 1, and the $X_1$ input may therefore be referred to as an A-C input. The $X_2$ input is directed to AND gates 81 and 84. Any number of additional inputs may be connected in a manner similar to the connection of the $X_2$ input, if desired. If, for example, the TCM circuit of FIG. 6(a) is to have three inputs per input section, the additional input is connected in a manner corresponding to that shown for the $X_2$ input.

In operation of the A-C D-C switch of FIG. 6(b), control input $S_i$ is directed to AND gate 88, which serves as a conventional switch. Another control input, $S_i'$, is used to control AND gates 81 and 84. If $S_i'$ is a 1, gate 81 forms an input minterm for the overall TCM, this minterm directed to "switch" 88 via OR gate 87. This path corresponds to the conventional switch circuit path of a trainable logical network, such as that designated by reference numeral 10 in FIG. 1. On the other hand, if $S_i'=0$, then gate 81 is open and gate 84 is enabled (by virtue of inverter circuit 85). A pulse output is generated from gtae 84 if $X_2$ is a logical one and $X_1$ changes from 0 to 1. It is therefore apparent that control signal $S_i'$ switches operation of the switch of FIG. 6(b) between a level output and a pulse output to gate 88.

Figure 6A:
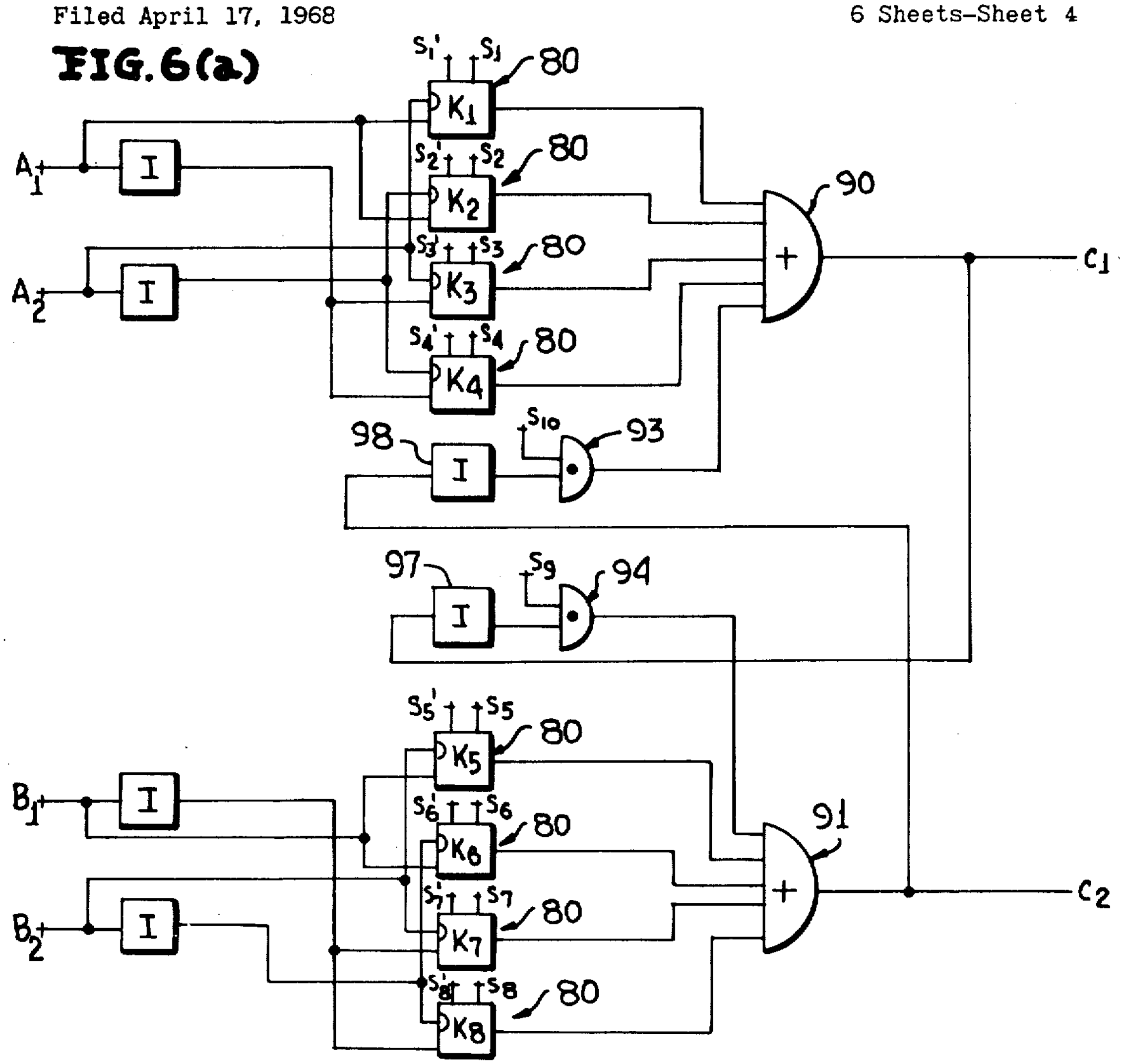
FIG. 6(a) is a circuit diagram of a combined A.-C. and D.-C. TCM.
Figure 6B:
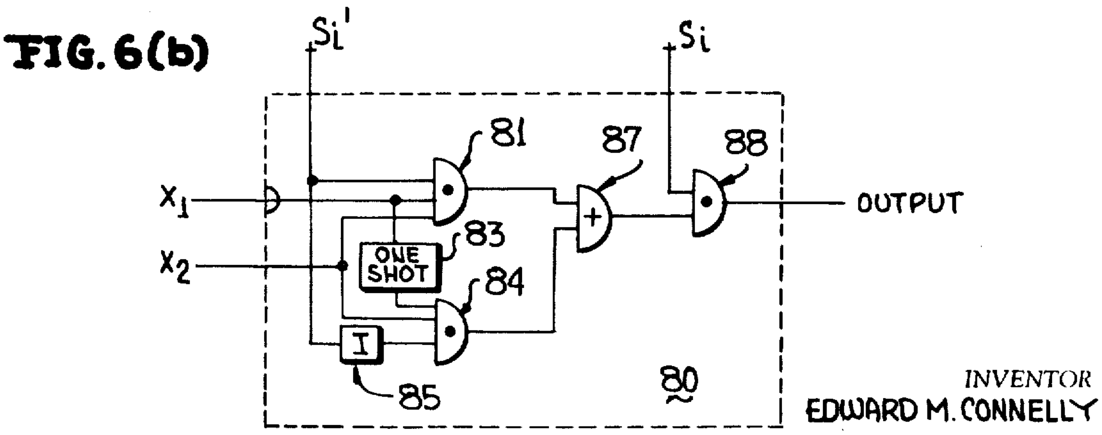
FIG. 6(b) is a circuit diagram of an A.-C., D.-C. type switch used in the circuit of FIG. 6(a)

A-C D-C switch 80 is used to implement the A-C D-C TCM shown in FIG. 6(a). Each of the AND combinations (minterms) of the input signals (e.g., $A_1$, $A_2$ and their negations) is formed by a respective switch 80. If the control signals $S_i'$ (i.e., $i=1, 2, \ldots n$) are all logical 1's, the function of the overall circuit of FIG. 6(a)

is exactly the same as that of FIG. 1, and the switch states are governed by the $S_i$ signals.

Assume, for the sake of example in describing circuit operation, that $S_1'=0$, $S_2=1$, and $A_1=1$, $A_2=0$. In that instance, AND gate 84 in the A-C circuit of switch $K_1$ is enabled to produce a pulse output when its A-C input goes from 0 to 1. When this happens, a pulse is produced at the output of the one shot circuit 83, and since $S_1=1$, the pulse is transmitted to OR gate 90. The other A-C D-C switches operate in similar manner except that different signals are used as logic variables. For example, switch $K_4$ and $\overline{A}_1$ as a logic control variable and $\overline{A}_2$ as a logic trigger variable.

The DC (level output) and AC (pulse output) conditions for each switch 80 in the circuit of FIG. 6(a) are shown in the following table:

| | Conditions for Level Output | Conditions for Pulse Output |
|---|---|---|
| Switch: | | |
| $K_1$ | $A_1=A_2=S_1'=S_1=1$ | $A_1=S_1=1$; $S_1'=0$; $A_1\ 0\rightarrow 1$ |
| $K_2$ | $A_1-\overline{A}_2=S_2'=S_2=1$ | $A_1=S_2=1$; $S_2''=0$; $\overline{A}_2\ 0\rightarrow 1$ |
| $K_3$ | $\overline{A}_1=A_2=S_3'=S_3-1$ | $\overline{A}_1=S_3=1$; $S_3'=0$; $A_2\ 0\rightarrow 1$ |
| $K_4$ | $\overline{A}_1=\overline{A}_2=S_4'=S_4=1$ | $A_1=S_4=1$; $S_4'=0$; $\overline{A}_2\ 0\rightarrow 1$ |
| $K_5$ | $B_1=B_2=S_5'=S_5=1$ | $B_1=S_5=1$; $S_5'=0$; $B_2\ 0\rightarrow 1$ |
| $K_6$ | $B_1=\overline{B}_2=S_6'=S_6=1$ | $B_1=S_6=1$; $S_6'=0$; $\overline{B}_2\ 0\rightarrow 1$ |
| $K_7$ | $\overline{B}_1=B_2=S_7'=S_7=1$ | $\overline{B}_1=S_7=1$; $S_7'=0$; $B_2\ 0\rightarrow 1$ |
| $K_8$ | $\overline{B}_1=\overline{B}_2=S_8'=S_8=1$ | $B_1S_8==1$; $S_8'=0$; $\overline{B}_2\ 0\rightarrow 1$ |

From the preceding description, it is clear that each A-C D-C switch, together with appropriate logical values of the associated input and control signals, can be used to direct levels or pulses to the respective OR gates 90 and 91 to provide outputs $C_1$ and $C_2$. Assume now, that feedback gates 93 and 94 are closed (i.e., $S_{10}=S_9=1$), and that $C_1=0$ and $C_2=1$. If, under these conditions, OR gate 90 should receive a pulse from one of its associated switches, $C_1$ goes to the true (i.e. logioal 1) state and a logical zero is therefore presented to OR gate 91 via inverter 97 and AND gate 94. The feedback from OR gate 91 via inverter 98 and AND gate 93 presents a logical 1 to OR gate 90 which maintains $C_1=1$ after the pulse has returned to the zero level. Hence, the TCM has a state that corresponds to an A-C triggered flip-flop. Moreover, the TCM network can be constructed to accept more than two logical inputs per input network.

Figure 7A:
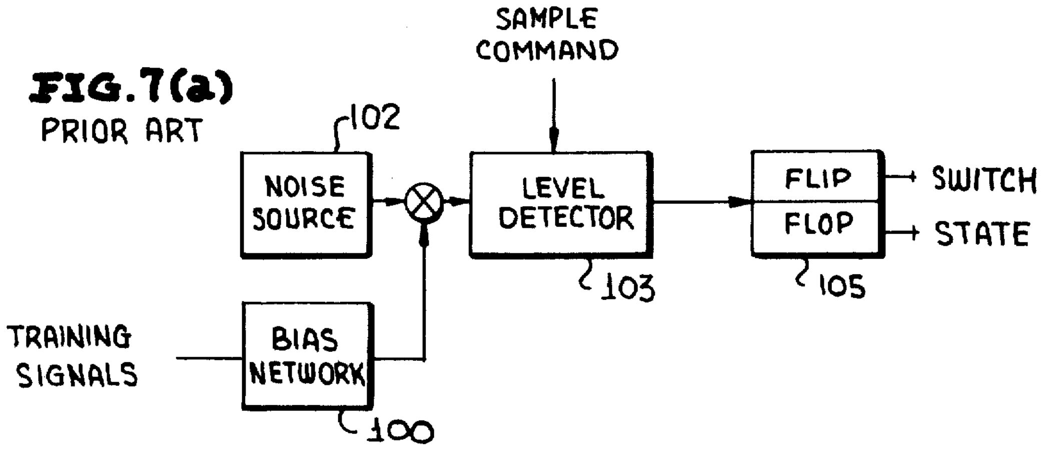
FIG. 7(a) PRIOR ART
FIGS. 7(a), (b), and (c) are circuit diagrams of alternate mechanisms for implementing the training of the circuit switches.

The objective of the module organization or training process is to establish a particular module configuration by setting each switch in its proper state. Because the number of electrical connections to the module is limited and it is desirable to reserve as many connections as possible for input/output signals, a method of module training that minimizes the number of training signal connections is preferred. In the past, the organization of trainable logical networks has generally required two training connections, viz., reward and punish. As shown in FIG. 7(a) one of these previous methods involves the application of the training signals to a bias network 100 to appropriately vary the network level and thereby the probability that the output of a noise source 102 will exceed that level over a given interval of time. The noise level exceeding the bias level is detected by detector 103, and when triggered by a sample command, the detector in turn triggers a flip-flop 105. For example, a reward signal may be used to increase the bias level to reduce the probability that the noise level will exceed it, and thus tend to maintain the switch in a state that results in the production of the desired output function by the trainable logical network.

Figure 7B:
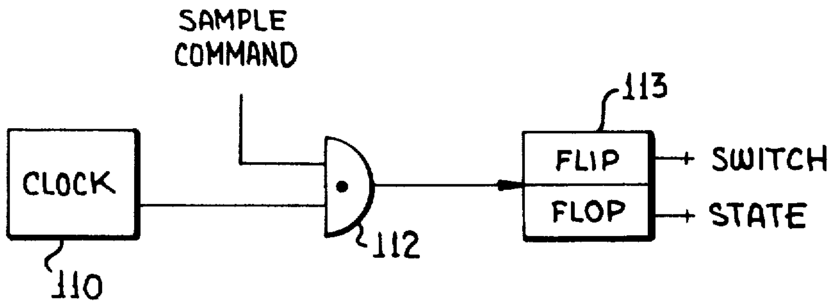

The circuit of FIG. 7(b) represents the implementation of a simplified method in which the frequency of a sample command is varied according to the training signals to correspondingly vary the probability that a clock pulse from clock 110 will be passed by AND gate 112 to trigger a change of state of flip-flop 113.

Figure 7C:
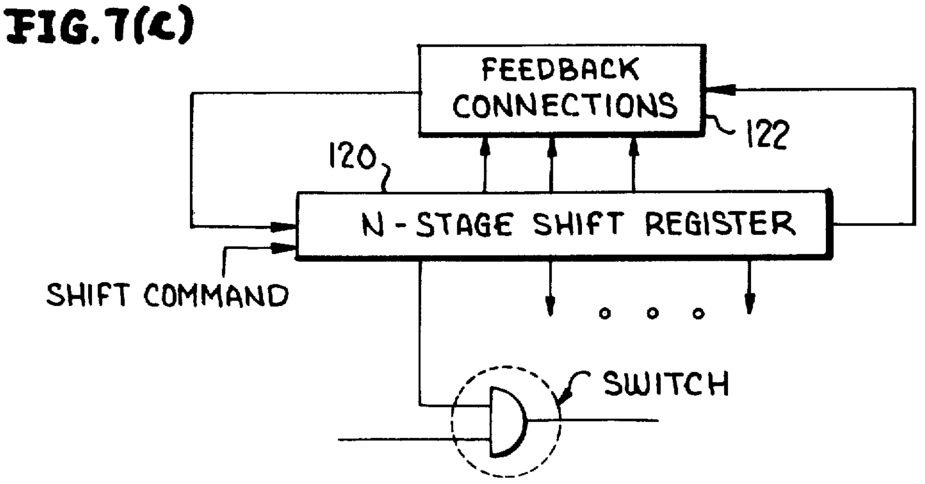

The circuit shown in FIG. 7(c), however, is preferred for training the TCM of the present invention, this training system employing a simplified "change state" training signal. In any event, the trainable mechanism incorporated in the module must permit the generation of all combinations of switch positions. Referring now to FIG. 7(c), shift register 120 has feedback connections designated 122 for providing a maximal length *m* sequence. Such arrangements are shown and discussed in detail in Error Correcting Codes, by W. W. Peterson (Wiley and Sons, 1961). The property of interest is that with proper feedback connections, shift register 120 will take all binary combinations of register states, except that in which each register stage contains a logical zero, as the register is shifted in response to a shift command input. The contents of the register stages are utilized to control the states of the switches. However, since the register cannot form the zero state in which each stage contains a logical zero, an extra stage is required. Thus, if the TCM contains N switches, the shift register should contain $N+1$ stages, one of which is not connected to the input of a switch. When the present module state is not the correct state, a training signal is supplied in the form of a shift command; whereas no shift command is generated when the present module state is satisfactory. This sequential deterministic training search is advantageous for the present application, allowing a systematic test of each switch combination. If redundant circuits are incorporated in the module, the deterministic (shift register) search method tests all switch combinations while observing only the input and output signals.

Module training may be accomplished by a trainer with two functions, viz, module test and training. In the module test function the states of all switches are checked and displayed to an operator to indicate which if any of the switches are inoperative.

Figure 8A:
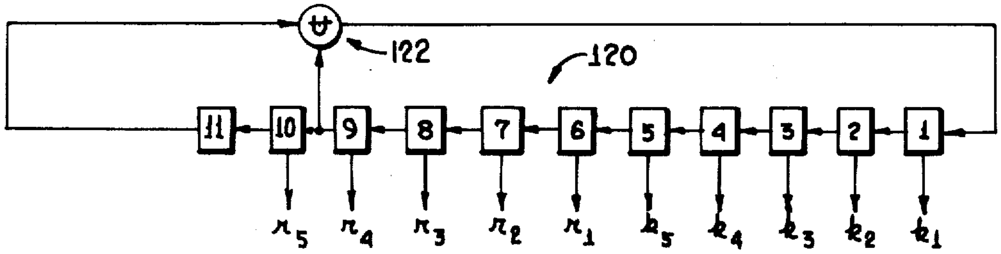
FIGS. 8(a), (b), (c), and (d) are circuit diagrams of devices of the type shown in FIG. 7(c), specifically for training the circuits of FIGS. 1, 4, 5 and 3, respectively.
Figure 8B:
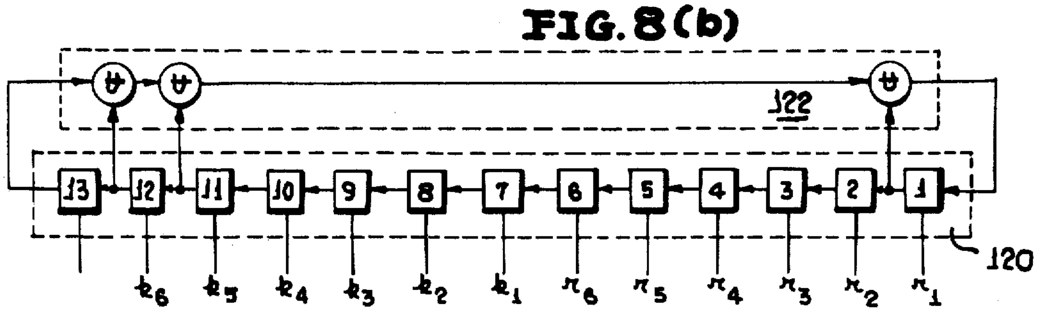
Figure 8B:
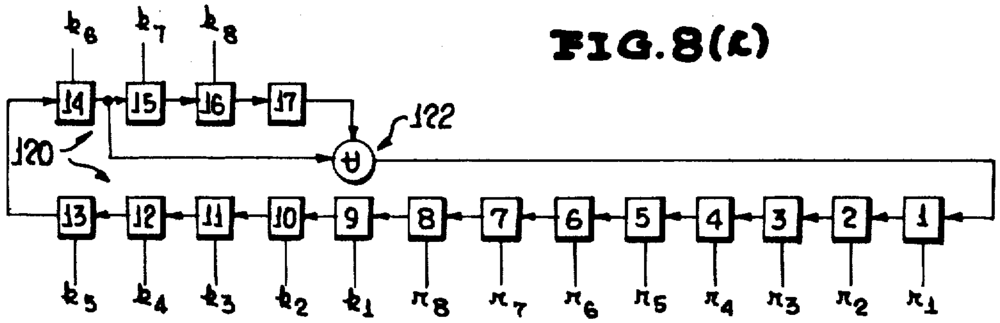
Figure 8B:
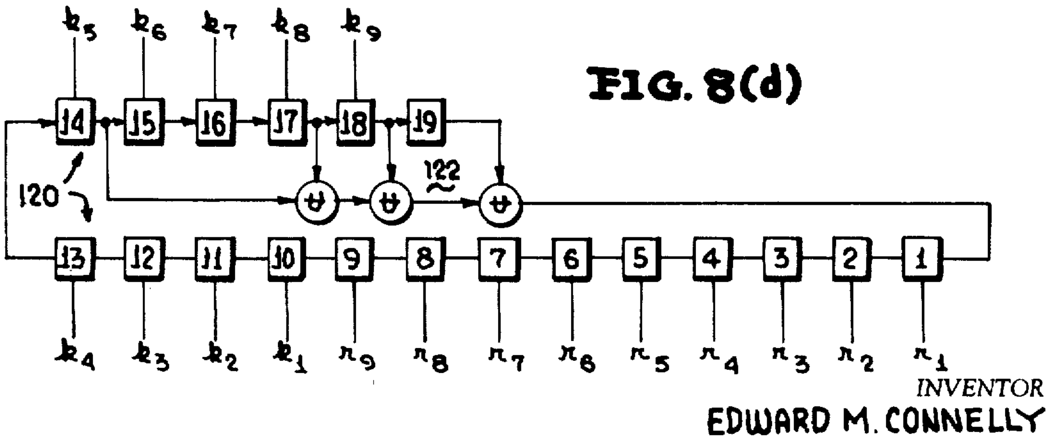

FIGS. 8(a), (b), (c), and (d) show the shift register of FIG. 7(c) with proper feedback connections for the TCM circuits of FIG. 1, FIG. 4, FIG. 5, and FIG. 3, respectively.

As previously noted, the trainable portion of the TCM circuit must have a power-off memory. The minimum memory requirement in terms of "memory time constant" depends upon the particular application, and may range upward to a month or more. It is clear, however, that certain so-called permanent memory devices, such as magnetic core memories, are expensive and for that reason may be less desirable for use in circuits of the present invention. In other words, it is often necessary to reach a compromise between several conflicting requirements, such as efficiency and cost.

Figure 9:
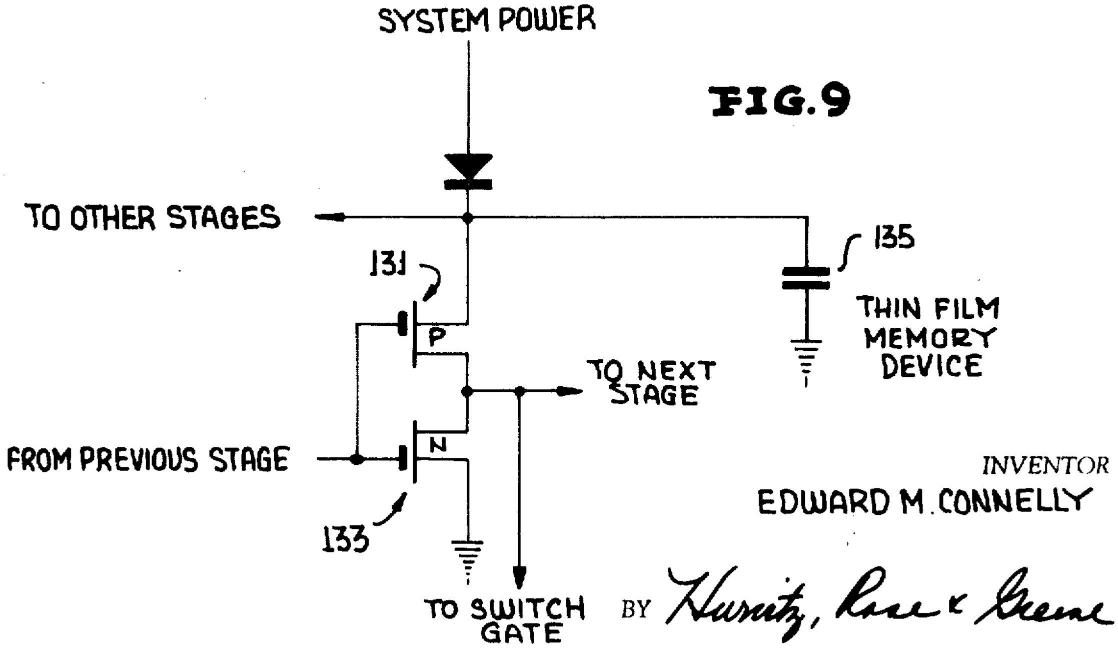
FIG. 9 is a circuit diagram of a switch memory device.

A preferred switch memory system is shown in FIG. 9. Complementary field effect switches, such as 131 and 133, are known to have the property of requiring very little current when in a static condition. During normal operation, power is supplied to the field effect devices of each training circuit stage from the usual system power supply, which also operates to charge a capacitive storage device 135. In this manner, stage by stage switching of the field effect devices occurs in response to an input from the immediately preceding stage, with current required for the switching operation provided by the system power supply. When system power is removed for any reason, however, the small current required to maintain the switch conditions immediately prior to power removal is supplied by storage element 135.

While I have described and illustrated one specific embodiment of my invention. it will be clear that variation of the details of construction which are specifically illustrated and described may be resorted to without departing from the spirit and scope of the invention as defined in the appended claim.

I claim:

1. A trainable computer module comprising a pair of multiple input-single output trainable logical networks of the type having means for generating the minterm products representing all combinations of the input variables, and having statistical switches coupled to receive respective ones of said combinations for supplying one or more of said combinations as a network output function, according to the training state of the respective switches; and means for selectively cross-coupling a function derived from the output function of each network as at least a portion of the output function of the other network.

2. In a self-organizing system responsive to a plurality of input variables for forming a desired logical function thereof in accordance with training information representative of the desired response and tending to organize the system thereto, said system comprising a pair of multiple input, single output organizable networks; each of said networks including a minterm generator for producing all non-redundant AND combinations of the respective logical input variables and their inversions, a plurality of statistical switches each responsive to a distinct and different one of said AND combinations for passing or blocking the passage thereof in accordance with said training information, and OR gate means for receiving the combinations passed by said switches as the respective network output function; and means for selectively feeding back at least a portion of the inverse of the logical output function of said system as a separate input function thereto, said means for selectively feeding back including an inverter circuit and a further statistical switch connected in series circuit for supplying the inversion of the output function of each of said networks as a further input signal to the OR gate means of the other, to provide a memory function for said system.

3. The combination according to claim 2 wherein said system includes means within each of said networks for compensating for switch failure therein.

4. The combination according to claim 3 wherein said OR gate means includes a first OR gate responsive to the AND combinations passed by said switches, an EXCLUSIVE OR gate having as one input the output of said first OR gate, and a further OR gate coupled to receive the output of said EXCLUSIVE OR gate and of said selective feedback means as inputs thereof; and wherein said compensating means includes a further statistical switch coupled to pass or block a logical input variable as another input to said EXCLUSIVE OR gate, in accordance with said training information.

5. The combination according to claim 2 wherein said switch training is provided in part by maximal length binary sequence generator means for supplying to each of said switches a logical command representative of a respective binary signal in said sequence, for controlling the state of the respective switch in accordance therewith, said sequence generator means comprises a shift register having feedback connections for producing said maximal length sequence, each stage of said shift register connected to a different one of said switches, and wherein said shift register is shifted according to said training information.

6. The combination according to claim 2 wherein said system includes at least two multi-input, single output trainable logical networks, each of said networks including a plurality of switches for selectively passing or blocking combinations of said input variables, and wherein each of said switches includes means for generating an A-C pulse output or a D-C level output according to the nature of the respective ones of said input variables.

7. A trainable logic circuit comprising:

a pair of adaptive devices, each including:

- a plurality of switches each capable of being opened or closed according to the nature of an instruction signal applied thereto,
- means for supplying different combinations of input variables to respective ones of said switches for passage or blockage thereof according to whether the respective switch is closed or open, and
- logic means for functionally combining, in the logical sense, the input variable combinations passed by said switches; and means for selectively applying the inverse of the logical function produced by said logic means of each of said adaptive devices to the logic means of the other adaptive devices as an input thereto together with said input variable combinations.

8. The invention according to claim 7 wherein said logic means comprises an OR gate for combining the inputs thereto according to a logical sum function.

9. The invention according to claim 8 wherein said means for supplying different combinations of input variables comprises means for generating non-redundant combinations of said input variables and their respective inversions according to a logical product function.

10. The invention according to claim 7 further including means for applying further inputs to said logic means of each of said adaptive devices to maintain said trainable logic circuit in the trained condition in the event of switch failure therein.

11. The invention according to claim 7 further including means to selectively apply further inputs to said logic means of each of said adaptive devices for compensating for switch failure therein.

12. The invention according to claim 7 wherein is provided a maximal length binary sequence generator comprising a shift register having a plurality of sequentially connected stages, and feedback means for varying the binary states of said stages through all combinations thereof excepting zero in all stages, each of said stages connected to a respective one of said switches to supply said instruction signal thereto.

13. The invention according to claim 7 wherein is further included memory means for maintaining said switches in the respective open or closed state for a predetermined time interval in the event of removal of normal operating power from said switches.

14. A trainable computer module comprising a pair of multiple input-single output trainable logical networks of the type having means for generating the minterm products representing all combinations of the input variables, and having statistical switches coupled to receive respective ones of said combinations for supplying one or more of said combinations as a network output function, according to the training state of the respective switches; and statistical switches for selectively cross-coupling a function derived from the output function of each network as at least a portion of the output function of the other network.

15. The combination according to claim 1 wherein is further provided means for converting said minterm generator from DC to AC pulse operation and comprising a one-shot multivibrator, means for generating an AC–DC control signal, a logic circuit for generating at least one of said minterm products and including gate means and means for applying said control signal, said input signals and an output signal of said one-shot multivibrator to various of said one-shot multivibrators and said gates such that an output pulse is produced in response to said AC-DC control signal achieving a specified level and in further responnse to change of one of said input signals from a first level to a second level.

16. The combination according to claim 15 wherein two of said gates are AND gates, means connecting one of said AND gates to receive said control signal and the other of said AND gates to receive an inverted control signal, means applying a first input signal to said one-shot multivibrator and said one of said gates, means applying the output signals of said one-shot multivibrator to said other of said AND gates, and OR gate and means for applying the output signals of both said AND gates to said OR gate.

References Cited

UNITED STATES PATENTS

| | | | |
|---|---|---|---|
| 3,097,349 | 7/1963 | Putzrath et al. | 340—172.5 |
| 3,303,473 | 2/1967 | Clapper | 340—172.5 |
| 3,327,291 | 6/1967 | Lee | 340—172.5 |
| 3,341,822 | 7/1967 | Mirabelli | 340—172.5 |
| 3,394,351 | 7/1968 | Martin | 340—172.5 |

PAUL J. HENON, Primary Examiner

S. CHIRLIN, Assistant Examiner